Figure 1:
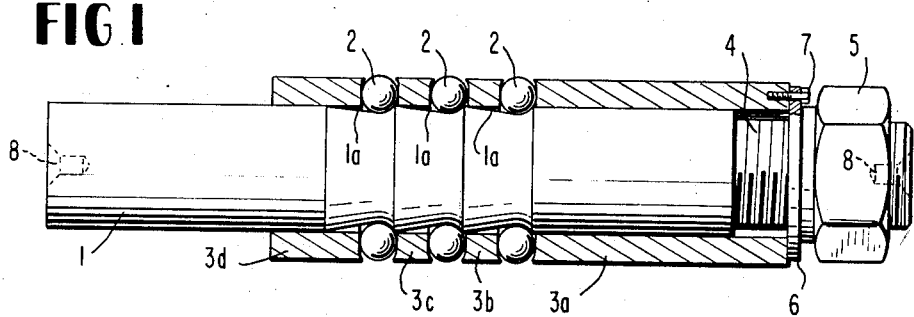

United States Patent

Forsstrom

[15] 3,704,640
[45] Dec. 5, 1972

[54] DEVICE FOR MOUNTING AND CENTERING A WORK PIECE FOR INSTANCE IN A MACHINE TOOL

[72] Inventor: Sven Gunnar Forsstrom, Kalmar, Sweden

[73] Assignee: Bergmans Motorindustri AB, Kalmar, Sweden

[22] Filed: Feb. 13, 1970

[21] Appl. No.: 11,218

[30] Foreign Application Priority Data

Feb. 24, 1969 Sweden ............................. 2506/69

[52] U.S. Cl. ................................................. 82/44
[51] Int. Cl. ........................................... B23b 31/40
[58] Field of Search .............. 82/44; 269/48.1; 279/2

[56] References Cited

UNITED STATES PATENTS 2,766,532  10/1956  Eisele .......................... 279/2 X
2,499,781  3/1950  Rothenberger .................... 279/2
2,734,749  2/1956  Benjamin ........................ 279/2
1,019,920  3/1912  Saum ............................ 82/44

Primary Examiner—Gil Weidenfeld
Attorney—Young & Thompson

[57] ABSTRACT

A device for mounting and centering a work piece with circular inner and/or outer surfaces e.g. in a machine tool, comprising two or more identical conical surfaces formed on a shaft or sleeve and supporting each a series of balls or similar members, which are radially displaceable to transfer the engagement with the circular surface of the work piece by relative axial displacement between the shaft or sleeve and one or more spacer members co-operating with the balls. The balls are arranged to engage directly with the circular surface of the work piece or to transmit the engaging action by means of at least three entirely separate and radially displaceable transfer members co-operating with the balls and equally distributed about the periphery of the shaft or sleeve.

4 Claims, 9 Drawing Figures

PATENTED DEC 5 1972  3,704,640
SHEET 1 OF 2

PATENTED DEC 5 1972

3,704,640

SHEET 2 OF 2

DEVICE FOR MOUNTING AND CENTERING A WORK PIECE FOR INSTANCE IN A MACHINE TOOL

The invention refers to a device for mounting and centering a work piece with a circular inner and/or outer surface e.g. in a machine tool, in which an exact centering at the mounting of the work piece is desired. The device comprises two or several identical conical surfaces formed on a shaft or sleeve, each of said conical surfaces supporting a series of balls or similar members, which are radially displaceable for transmitting the engagement with the circular surface of the work piece by relative axial displacement between the shaft or the sleeve and one or more spacer elements co-operating with the balls.

When mounting a work piece e.g. in a machine tool, it is often essential that the work piece is accurately centered in the machine. This is especially important e.g. for the manufacture of tubular elements in which the center lines of both inner and outer circular surfaces must exactly coincide so that no excentricity arises. The device for mounting the work piece must thus be able to center the work piece coaxially with the center line of a worked surface. It must permit the centering of the work piece rapidly in a simple manner so that the center line of a previously worked surface coincides with the center line of the device itself and the other circular surface can be worked so that also the center line of said other surface coincides with that of the device and consequently also with that of the first surface. The device must further be simple and reliable in its construction and easy to handle by the operator of the machine.

The purpose of the invention is to provide a device of the above said kind which in a more effective manner than previously satisfies the above said requirements of accuracy and simplicity in construction and handling.

This is obtained, according to the present invention, in that the balls are arranged to co-operate directly with the circular surface of the work piece or to transmit the engagement by means of at least three radially displaceable entirely separate transfer members co-operating with the balls and uniformly distributed around the periphery of the shaft or sleeve.

The spacer members co-operating with the balls can be formed of axially displaceable spacer sleeves, which can be independent of each other or connected with each other and which are arranged concentrically on the shaft or sleeve.

By such an arrangement with balls or like elements uniformly distributed around the periphery of exactly worked, conical surfaces a very accurate centering and adjustment of the engagement with the work piece is obtained in a simple manner by axial displacement of the spacer sleeves. The conical surfaces can be tapering in the same direction, in which case the balls are placed in the spaces between the loose or interconnected spacer sleeves and the engagement or displacement of the balls in the radial direction is obtained by axial displacement of the spacer sleeves. The balls then roll up on the conical surfaces and are displaced radially outwards in the spaces between the spacer sleeves.

The axial displacement of the spacer sleeves can be operated by providing at one end of the member supporting the conical surfaces a screw-threaded portion with a nut. The nut engages one end of the spacer sleeve nearest to the screw-threaded portion and the axial displacement is obtained by rotating the nut.

In another embodiment the device, according to the invention, has two conical surfaces tapering in opposite directions. A series of spacer sleeves is provided for each of the conical surfaces and the radial displacement of the balls is obtained by displacing the series of spacer sleeves axially towards each other against the action of springs, e.g. helical springs mounted between each series of spacer sleeves and the ends of the member supporting the conical surfaces. The helical springs provide for an uniform engagement of both series of balls with the work piece because the member supporting the conical surfaces adjusts itself automatically between the springs in such a manner that both series of balls are subjected to equal axial forces. In order to prevent the spacer sleeves in their unloaded state from being pushed off the member supporting the conical surfaces under the action of the springs and in order to limit the displacement in the direction of the spring load appropriate members in the form of abutments are preferably provided at the inner ends of the series of spacer sleeves. Members in the form of pins and grooves are also preferably used to prevent a relative rotation between the spacer sleeves and the conical surfaces.

The device, according to the invention, has preferably at its ends recesses situated on the central axis and arranged to receive centers or the like e.g. in a machine tool.

The device can have transfer members in the form of thin slotted plates within the range of the balls, which plates surround the spacer sleeves and have circular grooves corresponding to the cross section of the balls. At the radial outwards movement of the balls their engagement with the work piece will take place via the plates.

Instead of the above described spacer sleeves the balls can engage radially displaceable, combined spacer and transfer members, which transmit the engagement with the work piece. Thus, according to a further embodiment, the device may comprise a sleeve axially displaceable in a casing and provided with ball supporting conical surfaces, wherein the balls engage recesses or grooves in spacing and transmitting members radially displaceable in guides provided in the housing and uniformly distributed around the periphery of the sleeve, on which jaws are individually adjustable in the radial direction. By providing jaws radially adjustable on the members engaged by the balls a larger variation of the diameters of the work pieces can be allowed compared with the previously stated embodiments of the invention.

The axial movement of the sleeve can in this embodiment of the invention advantageously be operated by pneumatic or hydraulic means, in which case the sleeve is connected with a bar, which itself is connected with the piston of a pneumatic or hydraulic cylinder. For the positive control of the radial movements both outwards and inwards the sleeve may be provided with similar conical surfaces both on its inner and its outer surface.

The invention will be described in the following with reference to the accompanying drawings, in which FIG. 1 is a side view, partially in section of an embodiment of the invention, FIG. 2 a plain side view of the device according to FIG. 1, FIG. 3 a side view partially in section of a second embodiment of the invention with conical surfaces tapering in opposite directions, FIG. 4 an axial section through the device, according to the invention, in which the conical surfaces are formed on the inner surface of a sleeve, FIGS. 5 and 6 axial and radial sections, respectively, through the device, according to the invention, provided with plates surrounding the spacer sleeves, FIG. 7 an end view of an embodiment of the invention with radially displaceable members engaging the balls, FIG. 8 an axial section through a device according to FIG. 7, and FIG. 9 a view from above of one of the members engaging the balls according to FIGS. 7 and 8.

On a shaft 1 (FIGS. 1 and 2) are formed three axially separated conical surfaces 1a tapering in the same direction. These surfaces are engaged by balls 2, the position of which is determined by spacer sleeves 3a, 3b, 3c and 3d. The spacer sleeves can be loosely mounted on the shaft or interconnected by connecting portions 3e so that the spacer sleeves together form a single unit. The shaft 1 at its one end has a screw-threaded portion 4, on which is mounted a nut 5. The nut 5 rests against a washer 6 having an inner diameter sufficiently large to permit the washer to be freely displaced along the screw-threaded portion 4. The washer is by appropriate means 7 fixedly mounted on the spacer sleeve 3a situated nearest the screw-threaded portion. The device has borings 8 at its both ends arranged to receive e.g. the centers of a machine tool, an indicating device or the like.

Figure 2:
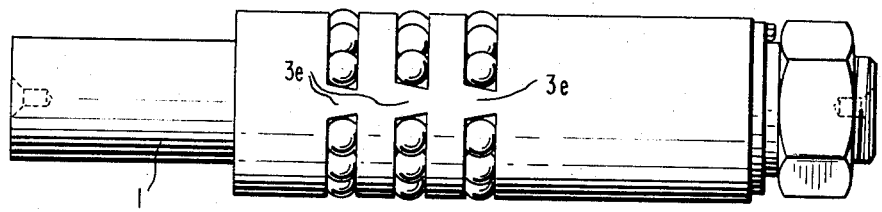

The centering of a tubular work piece is performed by sliding the work piece over the device while the balls are in the position illustrated in FIGS. 1 and 2, i.e. on the radially innermost portions of the conical surfaces. Thereafter the nut 5 is turned to be displaced to the left in FIGS. 1 and 2, whereby the spacer sleeves 3a, 3b, 3c and 3d are displaced to the left. The balls 2 will then under the action of the spacer sleeves roll or slide up onto the radially outer portions of the conical surface and protrude outwards through the spaces between the spacer sleeves so that the work piece is clamped. Since the conical surfaces 1a have a very accurately identical conical form, all the balls 2 will move equal distances radially outwards. Hereby an exact centering of the work piece is obtained with reference to the center axis. With the work piece mounted in place the device can be mounted e.g. between the centers of a machine tool, said centers engaging the borings 8 of the center shaft.

Figure 3:
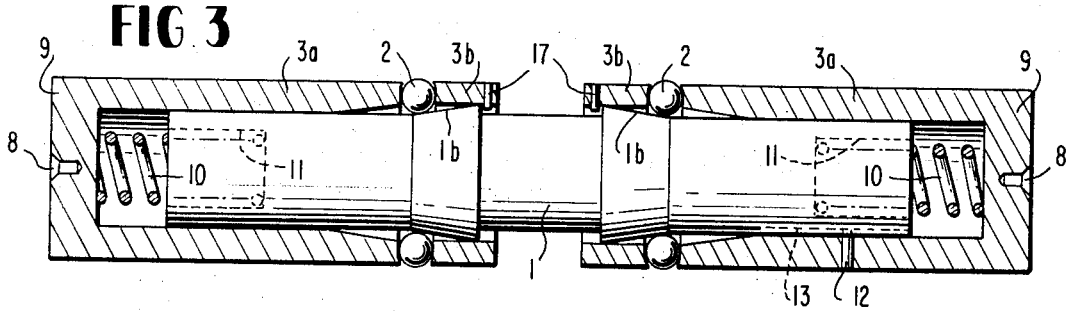

In the embodiment illustrated in FIG. 3 the shaft 1 has two conical surfaces 1b tapering in opposite direction. Each conical surface has a series of spacer sleeves 3a, 3b which determine the location of the balls 2. The spacer sleeve 3a has one end closed by a portion 9 in which the recess 8 is bored. Between each end of the shaft 1 and the adjacent portions 9 of the sleeves is inserted a helical spring 10, of which one end rests against the inside of portion 9 and the other end against the bottom of a boring 11 in the adjacent shaft end. Abutments, e.g. in the form of pins 17, are provided at the ends turned towards each other of the spacer sleeves 3b to limit the movement in the direction of the force of the spring. The spacer sleeves 3a and 3b are interconnected by connecting members not shown. Pins 12 and grooves 13 are arranged in the spacer sleeves and, respectively, in the shaft to engage each other and to prevent a relative rotation.

When mounting the device with a work piece e.g. between the centers of a machine tool, the spacer sleeves 3a and 3b are pressed towards each other against the action of the springs 10, whereby the balls 2 are displaced radially outwards and clamp the work piece in position. The springs 10 control that the radially outwards directed force is equal for both series of balls so that an accurate centering is achieved.

Figure 4:
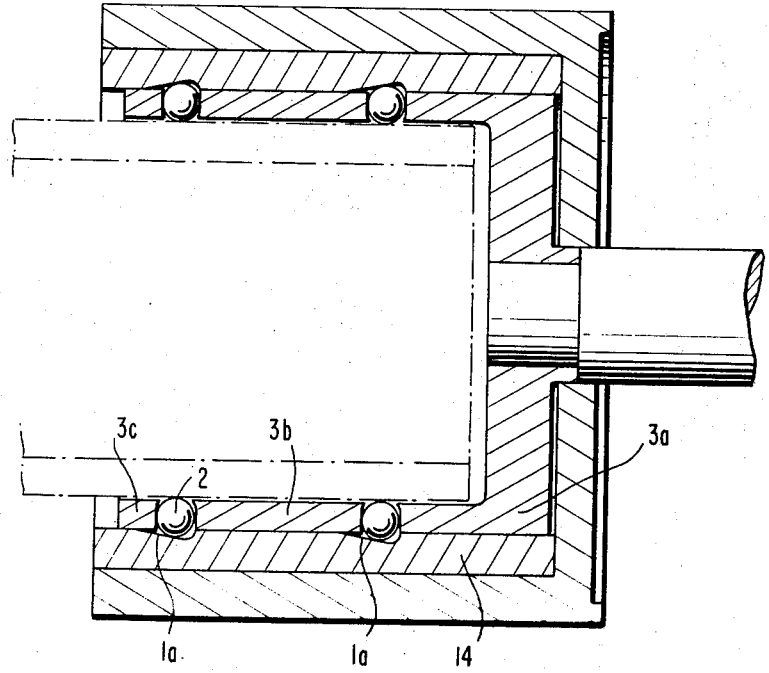

FIG. 4 shows an embodiment of the invention in which the shaft is replaced by a sleeve 14 with conical surfaces 1a. This device is provided for gripping a work piece by its outer circular surface. The function is in its principles not different from that of the previously described embodiments and the displacement of the spacer sleeves 3a, 3b and 3c can be effected by means of a screw and a nut as previously described. In this embodiment of the device its closed end is intended to be connected with the spindle of a machine tool or the like by means of known means not illustrated, e.g. bolts.

Figure 5:
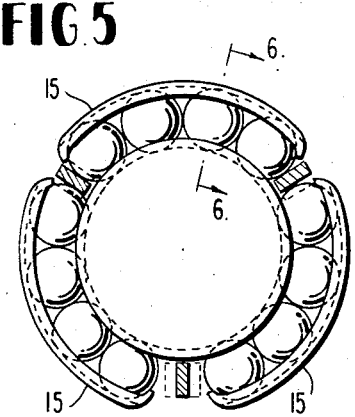
Figure 6:
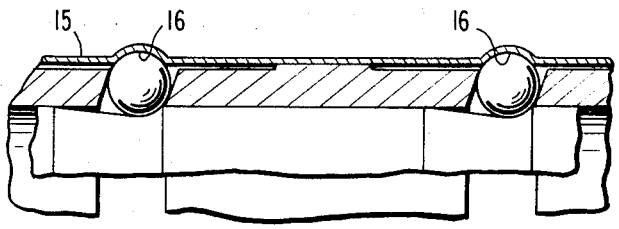

In order to reduce the wear of the balls the spacer sleeves can within the range of the balls be surrounded by axially slotted, thin plates 15 with ball guiding grooves 16, as shown in FIGS. 5 and 6. The plates also protect the work piece, which is of great importance when the work piece is of relatively soft material.

Figure 7:
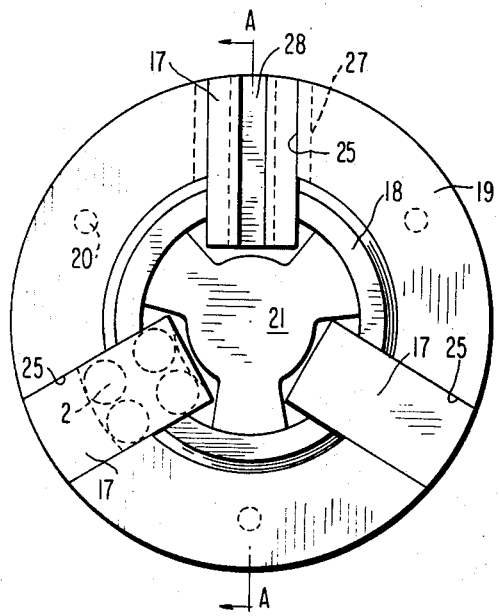
Figure 8:
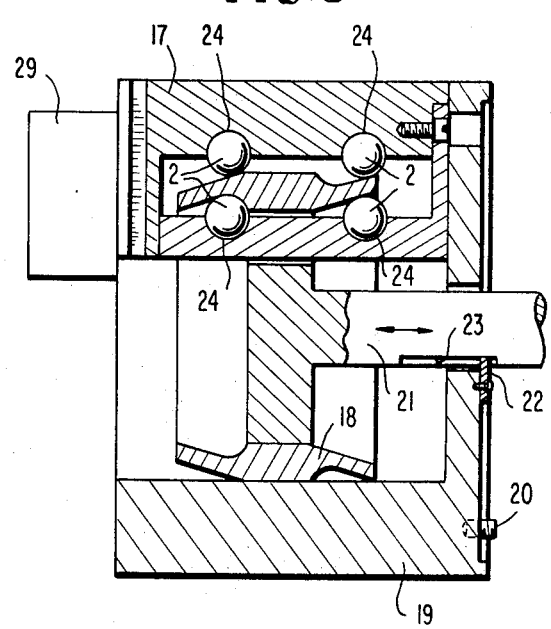
Figure 9:
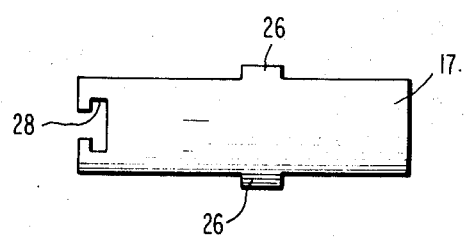

Instead of letting the balls 2 engage the work piece directly, means 17 can be provided, as shown in FIGS. 7 to 9, to which the radially outward movements of the balls are transmitted. In this embodiment of the invention a sleeve 18 with conical surfaces 1c is mounted axially displaceable within a casing 19. The casing 19 is to be connected by means of screws or other appropriate means to the spindle of a machine tool or the like. The sleeve 18 is fixedly connected with a bar 21 extending through the rear wall of the housing and connected with the piston of a pneumatic or hydraulic cylinder not shown. A pin 22 mounted on the housing 19 engages a groove 23 in the bar 21 to rotate it with the housing, but obviously other means could be used for this purpose. The balls 2 are mounted in grooves 24 in the members 17. These are uniformly distributed about the periphery of the casing 19 and engage radial recesses 25 in said casing. As clearly shown in FIG. 9 the members 17 comprise guides 26 which engage corresponding grooves 27 in the side walls of the radial recesses 25. In the embodiment described the balls are mounted by pairs in the grooves 24 and are maintained therein by appropriate ball cages. In the forward ends of the members 17 there are grooves 28 (FIG. 9) which receive radially adjustable jaws 29 (FIG. 8) for gripping a work piece or the like.

When the pneumatic or hydraulic cylinder not shown is energized, the bar 21 and together with it the sleeve 18 are displaced axially. Thereby the balls 2 are displaced radially under the action of the conical surfaces 1c. The radial movement of the balls is transmitted to the member 17 and therefrom to the jaws 29. If the starting position is that illustrated in FIG. 8 and if the bar 21 is displaced to the right in the drawing, the member 17 will be displaced radially inwards and the jaws will grip the work piece. The radially inner conical surfaces and balls are then active in this process. By displacement of the bar in the opposite direction, the radial movement of the members will be produced by the radially outer conical surfaces and balls. The total displacement in the radial direction is limited to about 10 mm, but by the fact that the jaws 29 are adjustable on the members 17, large variations of the dimensions of the work piece can be allowed.

What I claim is:

1. A device for mounting and centering a workpiece with a circular contour, comprising a sleeve, said sleeve having a plurality of series of openings therethrough, each said series comprising a plurality of openings lying in a common plane perpendicular to the axis of the sleeve, balls in each of said openings, said balls having a diameter greater than the thickness of the sleeve, and a member concentric with said sleeve, said member having a plurality of conical surfaces thereon all of which are inclined in the same direction and are of the same slope and are of the same spacing as said series of openings, each of said conical surfaces engaging the balls of one of said series of openings, said member and said sleeve being axially movable relative to each other simultaneously to move all said balls equal radial distances.

2. A device as claimed in claim 1, the radially inner one of said member and sleeve having external screw threads thereon, and a nut engageable with said screw threads and bearing axially against the outer one of said member and sleeve thereby to move said member and sleeve axially relative to each other upon manipulation of said nut.

3. A device as claimed in claim 1, said member being a shaft disposed within said sleeve.

4. A device as claimed in claim 1, said member being a further sleeve surrounding the first-mentioned sleeve and having said conical surfaces on its inner surface.

* * * * *